United States Patent
Pilon et al.

(10) Patent No.: US 8,375,523 B2
(45) Date of Patent: Feb. 19, 2013

(54) BREAK-AWAY BUNDLING DEVICE

(75) Inventors: Roger E. Pilon, Avoca, MI (US); Jason A. Meyers, Shelby Township, MI (US)

(73) Assignee: Newfrey LLC, Newark, DE (US)

( * ) Notice: Subject to any disclaimer, the term of this patent is extended or adjusted under 35 U.S.C. 154(b) by 71 days.

(21) Appl. No.: 12/797,805

(22) Filed: Jun. 10, 2010

(65) Prior Publication Data

US 2010/0242231 A1 Sep. 30, 2010

Related U.S. Application Data

(62) Division of application No. 11/699,972, filed on Jan. 30, 2007, now Pat. No. 7,740,210.

(60) Provisional application No. 60/845,232, filed on Sep. 15, 2006.

(51) Int. Cl.
*B65D 63/10* (2006.01)

(52) U.S. Cl. ............... 24/16 PB; 24/17 AP; 24/16 R; 24/17 A; 248/74.2; 248/74.3

(58) Field of Classification Search ........... 248/74.3, 248/74.2, 909, 74.1, 68.1; 24/16 PB, DIG. 16
See application file for complete search history.

(56) References Cited

U.S. PATENT DOCUMENTS

| | | | |
|---|---|---|---|
| 1,871,064 A | 8/1932 | Kipper et al. | |
| 2,974,916 A | 3/1961 | Richey | |
| 3,072,986 A | 1/1963 | Lefnaer | |
| 3,086,265 A | 4/1963 | Orenick et al. | |
| 3,290,080 A | 12/1966 | Dawson | |
| 3,422,499 A | 1/1969 | Merser | |
| 3,462,802 A | 8/1969 | Merser | |
| 3,467,427 A | 9/1969 | Moberg | |
| 3,588,963 A | 6/1971 | Moberg | |
| 3,597,803 A | 8/1971 | Van Neil | |
| 3,600,027 A | 8/1971 | Noland et al. | |
| 3,712,655 A | 1/1973 | Fuehrer | |
| 3,830,538 A | 8/1974 | Moberg | |
| 3,944,269 A | 3/1976 | Lundberg | |
| 3,954,295 A | 5/1976 | Harley | |
| 3,973,292 A | 8/1976 | Bonnet | |
| 3,973,299 A | 8/1976 | Keefe | |
| 4,001,919 A | 1/1977 | Moberg et al. | |
| 4,038,725 A | 8/1977 | Keefe | |
| 4,093,288 A | 6/1978 | Suzuki | |
| 4,214,349 A | 7/1980 | Munch | |
| D265,055 S | 6/1982 | Bone | |
| 4,537,432 A | 8/1985 | Meeks | |

(Continued)

FOREIGN PATENT DOCUMENTS

DE 94 19 475 2/1995
DE 197 16 864 11/1998

(Continued)

*Primary Examiner* — Amy J Sterling
(74) *Attorney, Agent, or Firm* — Harness, Dickey & Pierce, P.L.C.

(57) ABSTRACT

A bundling device includes a molding of a polymeric material. A flexible strap includes multiple teeth each including a notch. The strap is frangible at the notch of any one of the teeth. A strap engagement portion connected to the strap includes first and second flexible wings defining a strap receiving aperture therebetween receiving the flexible strap in a first direction. The flexible wings engage successive ones of the teeth to oppose removal of the strap in an opposite second direction. The first and second flexible wings each include a first arm having a first raised portion extending into the strap receiving portion; and a second arm having a second raised portion axially displaced with respect to the first raised portion and oriented out of plane with respect to the first raised portion.

4 Claims, 16 Drawing Sheets

U.S. PATENT DOCUMENTS

| | | | |
|---|---|---|---|
| 4,570,303 A | 2/1986 | Richmond et al. | |
| 4,580,319 A | 4/1986 | Paradis | |
| 4,586,570 A | 5/1986 | Swift | |
| 4,609,218 A | 9/1986 | Chevillard et al. | |
| 4,711,002 A | 12/1987 | Kreeger | |
| 4,722,562 A | 2/1988 | Burt | |
| 4,728,064 A | 3/1988 | Caveney | |
| 4,854,014 A | 8/1989 | Ueno | |
| 4,896,852 A | 1/1990 | Akema | |
| D308,016 S | 5/1990 | Tritton et al. | |
| 4,929,006 A | 5/1990 | Tsay | |
| 4,946,210 A | 8/1990 | Fuehrer | |
| 5,056,837 A | 10/1991 | Fuehrer | |
| 5,079,803 A | 1/1992 | Moore | |
| 5,125,700 A | 6/1992 | Fattori et al. | |
| 5,154,376 A | 10/1992 | Baum et al. | |
| 5,207,694 A | 5/1993 | Broome | |
| 5,337,503 A | 8/1994 | Goby | |
| 5,520,691 A | 5/1996 | Branch | |
| 5,524,945 A | 6/1996 | Georgopoulos et al. | |
| 5,568,952 A | 10/1996 | Ruegg | |
| 5,758,390 A * | 6/1998 | Villeneuve | 24/16 PB |
| 5,803,413 A | 9/1998 | Benoit et al. | |
| 5,855,591 A | 1/1999 | Bierman | |
| 5,926,921 A | 7/1999 | Benoit | |
| 6,047,447 A | 4/2000 | Ueno | |
| 6,098,253 A | 8/2000 | Nishida et al. | |
| 6,382,570 B1 | 5/2002 | Simpson et al. | |
| 6,446,311 B1 | 9/2002 | Ueno | |
| 6,449,808 B1 | 9/2002 | Zappa et al. | |
| 6,640,393 B2 | 11/2003 | Wendle | |
| 6,681,451 B1 | 1/2004 | Adams et al. | |
| 6,938,305 B2 * | 9/2005 | Garver | 24/16 PB |
| 6,961,979 B2 | 11/2005 | Wendle | |
| 6,981,725 B2 | 1/2006 | Debrody et al. | |
| 7,008,429 B2 | 3/2006 | Golobek | |
| 7,278,188 B2 * | 10/2007 | Kurmis | 24/16 PB |
| 7,520,030 B2 * | 4/2009 | Laporte | 24/16 PB |
| 7,681,844 B2 * | 3/2010 | Rosemann et al. | 248/74.3 |
| 7,740,210 B2 * | 6/2010 | Pilon et al. | 248/74.3 |
| 7,934,297 B2 * | 5/2011 | Williams et al. | 24/16 PB |
| 2001/0023836 A1 | 9/2001 | Ueno et al. | |
| 2004/0049890 A1 | 3/2004 | Kurmis | |
| 2006/0144951 A1 | 7/2006 | Schiebler | |

FOREIGN PATENT DOCUMENTS

| | | |
|---|---|---|
| EP | 0 240 036 | 10/1987 |
| GB | 2 164 003 | 3/1986 |
| WO | WO02/13165 | 2/2002 |

* cited by examiner

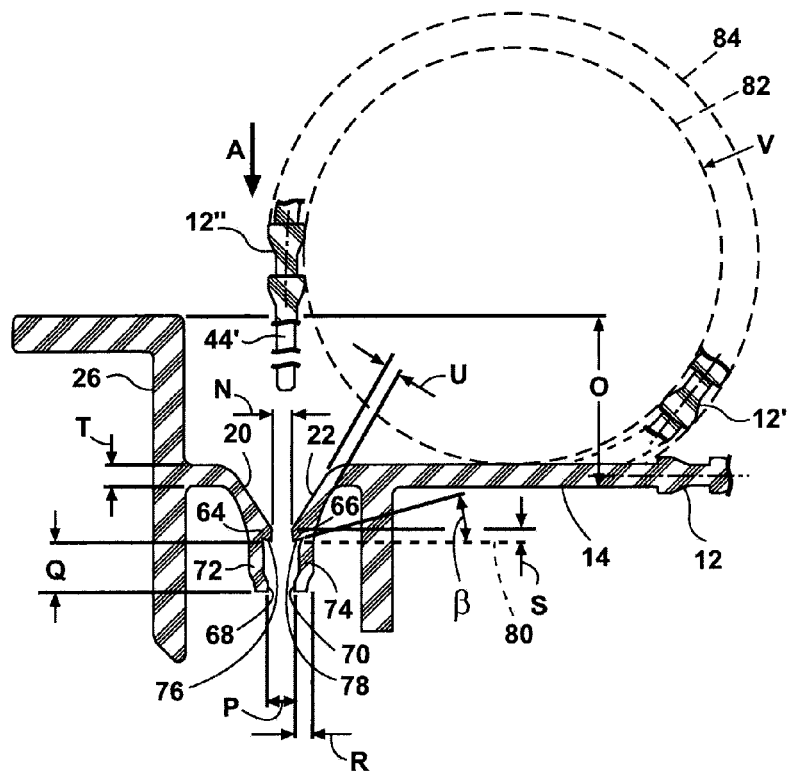
Fig. 3
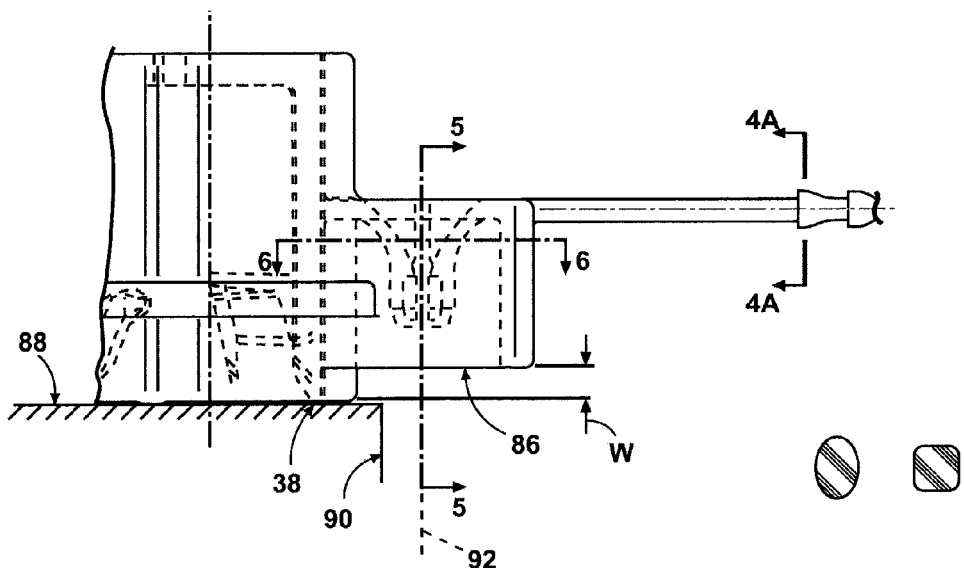
Fig. 4
Fig. 4A

BREAK-AWAY BUNDLING DEVICE

CROSS-REFERENCE TO RELATED APPLICATIONS

This application is a divisional of U.S. patent application Ser. No. 11/699,972 filed on Jan. 30, 2007, which claimed the benefit of U.S. Provisional Application No. 60/845,232, filed on Sep. 15, 2006. The entire disclosures of each of the above applications are incorporated herein by reference.

FIELD

The present disclosure relates to plastic clips or ties used to tie or bundle together multiple items including wires, wireway harnesses, tubing, and the like.

BACKGROUND

The statements in this section merely provide background information related to the present disclosure and may not constitute prior art.

Several methods are currently in use in the automotive and other industries to temporarily retain multiple components such as wire bundles and harnesses. A first method uses tape to encircle the components during shipment. Tape creates several problems, including difficulty in removal which commonly creates damage to the components from sharp objects used to cut the tape. A further problem from use of tape is the waste which accumulates on the assembly area floor, because the adhesive portion of the tape tends to adhere to the floor and make cleanup costly and time consuming.

Bundling devices such as tie straps are known which are used in place of tape in these applications. Known tie straps include flexible straps having teeth which are received in a ratcheting type element to lock the strap about objects such as tubing, wires, wire bundles, harnesses, and the like. The teeth are commonly held in a non-removable manner by the ratchet member.

One problem with known tie strap devices occurs when the bundling device is a temporary device intended for use for shipment from a part supplier such as an electrical wireway or instrument supplier which is subsequently removed. Known tie straps are not easily removed by hand and are therefore cut to remove them. This additional step is slow and can also damage the product.

SUMMARY

According to several embodiments for a break-away bundling device of the present disclosure, a bundling device includes a flexible, frangible strap having a plurality of engagement teeth. A structure homogenously connected to the frangible strap has at least two flexible wings positioned in opposed relationship operable to permit passage of the strap between the wings in a first direction and to engage at least one of the engagement teeth to oppose removal of the strap in an opposite second direction. When the frangible strap breaks a broken-free portion of the strap is retained between the flexible wings.

According to other embodiments, a bundling device includes a flexible, frangible strap having a plurality of engagement teeth. A strap engagement portion is fixedly connected to the strap. The engagement portion includes at least two flexible wings positioned in opposed relationship and defining a strap receiving aperture therebetween operable to receive the flexible strap in a first direction, the flexible wings operable to prevent removal of the strap in an opposite second direction. A raised engagement surface extends from each of the flexible wings, and opposed ones of the raised engagement surfaces are operable to frictionally contact one of the plurality of teeth. When the frangible strap breaks a broken-free portion of the strap is retained between the flexible wings by contact with the raised engagement surfaces.

According to still further embodiments, a bundling device includes a molding of a polymeric material. The molding includes a flexible strap having a plurality of substantially arrowhead-shaped teeth, the strap frangible between any successive ones of the teeth at a notch created in each of the teeth. A strap receiving member is homogenously connected to the strap. The strap receiving member includes first and second flexible wings defining a strap receiving aperture therebetween operable to receive the flexible strap in a first direction, the flexible wings operable to prevent removal of the strap in an opposite second direction. A raised engagement surface of the first flexible wing is oriented to face a raised engagement surface of the second flexible wing. The raised engagement surfaces are operable to frictionally contact one of the plurality of teeth. When the frangible strap is broken a portion of the strap is retained between the flexible wings by contact with the raised engagement surfaces of the flexible wings.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a cross sectional side elevational view taken at section 3 of FIG. 2;

FIG. 4 is a partial side elevational view of the bundling device of FIG. 2;

FIG. 4A is a cross sectional end view taken at section 4A of FIG. 4;

DETAILED DESCRIPTION

Figure 1:
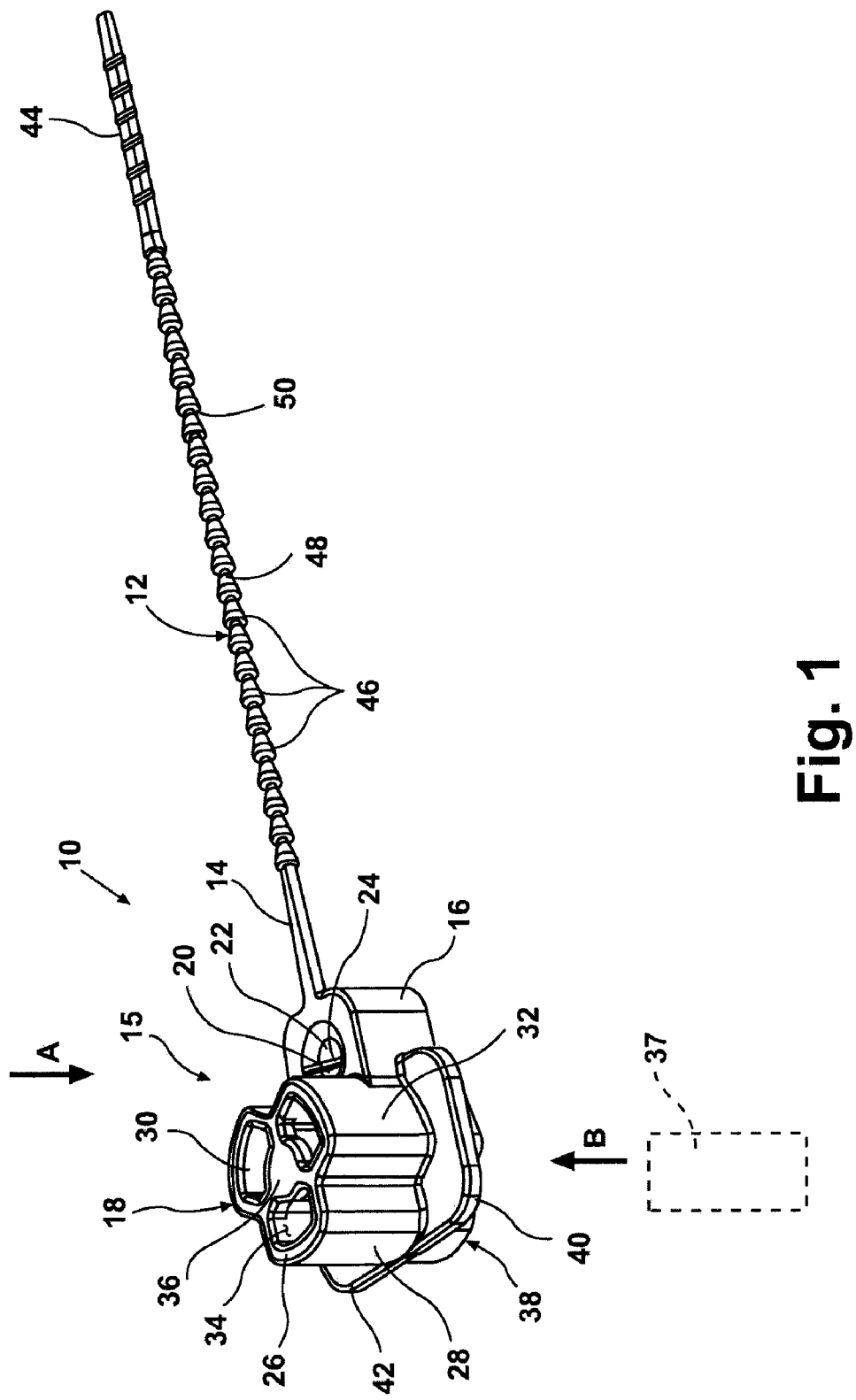
FIG. 1 is a side perspective view of a bundling device according to several embodiments of the present disclosure.

The following description is merely exemplary in nature and is not intended to limit the present disclosure, application, or uses. It should be understood that throughout the drawings, corresponding reference numerals indicate like or corresponding parts and features.

Referring generally to FIG. 1, according to several embodiments a bundling device 10 includes a flexible strap 12 homogenously connected by a tether portion 14 to a locking mechanism 15. Locking mechanism 15 includes a strap engagement portion 16 and can include a fastener mount portion 18 homogenously connected to the locking mechanism 15. Strap engagement portion 16 includes at least two elastically flexible wings 20, 22 which define a strap receiving aperture 24 adapted to receive strap 12 in a strap receiving direction "A". Strap receiving aperture 24 is defined between the flexible wings 20, 22 in a non-deflected condition of the flexible wings. Fastener mount portion 18 can include a fastener enclosure wall 26 which in several embodiments includes first, second and third extending portions 28, 30, and 32 which substantially define a clover-leaf shape and further define a fastener receiving cavity 34. It is noted fastener enclosure wall 26 can also define multiple geometric shapes, including but not limited to a circle or an oval (which do not include any extending portions), or a rectangle, a triangle, and the like with a correspondingly different quantity and shape of any extending portions.

A fastener stop 36 homogenously extends from fastener enclosure wall 26 and defines a first end of fastener receiving cavity 34. A fastener 37 (described in greater detail in reference to FIG. 7) can be received within cavity 34 in a fastener receiving direction "B" through a substantially flat mounting face 38 to a maximum depth defined by contact with fastener stop 36 which is positioned opposite to mounting face 38. Mounting face 38 defines a second end of the fastener enclosure wall 26. First and second flanges 40, 42 can also be homogenously connected to and extend outwardly from fastener mount portion 18 to manually aid in installation of bundling device 10 onto a pre-positioned fastener or to remove bundling device 10 from the fastener.

Strap 12 includes a free end 44 which is adapted to be received in strap receiving aperture 24 after strap 12 is flexed. According to several embodiments an envelope of the free end 44 corresponds approximately to an aperture geometry of the strap receiving aperture 24. A plurality of teeth 46 are created between free end 44 and tether portion 14. According to several embodiments teeth 46 are substantially arrowhead-shaped each having a reduced cross sectional end 48 sized for free passage through the strap receiving aperture 24. Teeth 46 also each include a substantially flat engagement end 50 positioned opposite to and oriented substantially perpendicular to a longitudinal axis of reduced cross sectional end 48. Engagement ends 50 engage flexible wings 20, 22 to prevent disengagement of strap 12 after at least one of engagement ends 50 pass flexible wings 20, 22 in strap receiving direction "A".

Figure 2:
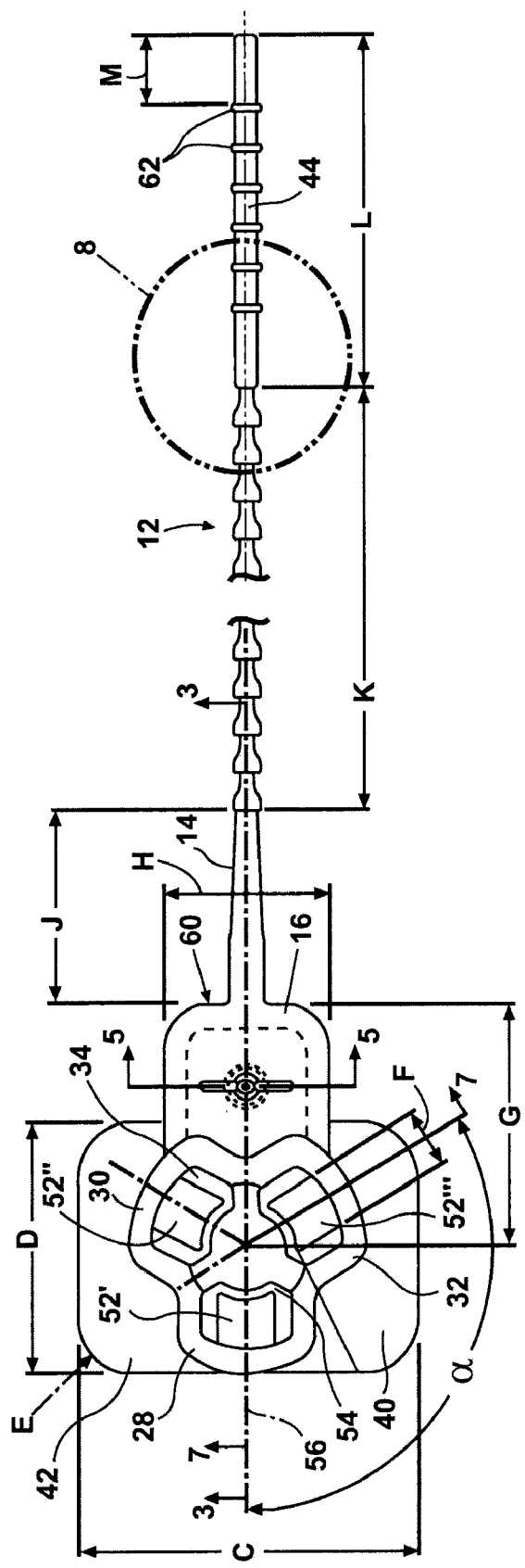
FIG. 2 is a top plan view of the bundling device of FIG. 1.

Referring now generally to FIG. 2, enclosure wall 26 includes a plurality of elastically deflectable arms 52 extending inwardly and defining a fastener receiving aperture 54 which is a portion of cavity 34. In the embodiment shown each of first, second and third extending portions 28, 30, and 32 include a first, second, and third deflectable arms 52', 52", and 52'" respectively. Fastener receiving aperture 54 is perpendicular to and bisected by a bundling device longitudinal axis 56. The deflectable arms 52 are equally angularly separated from each other by an angle α, which in the embodiment shown is approximately 120 degrees.

Bundling device 10 has a total width "C" across both first and second flanges 40, 42, a length "D" of each of first and second flanges 40, 42, and radaii "E" provided at corners of first and second flanges 40, 42. Each of first, second, and third deflectable arms 52', 52", and 52'" has a flange width "F". A wall 60 of strap engagement portion 16 extends by a dimension "G" from a longitudinal axis of fastener enclosure wall 26 and strap engagement portion 16 has a portion width "H". Tether portion 14 extends from wall 60 by a length "J" to a position where strap 12 is created. Strap 12 includes a toothed length "K" and a free end length "L" having a lead-in length "M". Free end 44 can further include at least one peripherally extending rib 62.

As best seen in FIG. 3, flexible wing 20 includes a first raised portion 64 located within strap receiving aperture 24 and flexible wing 22 similarly includes a first raised portion 66 which opposes first raised portion 64. First raised portions 64, 66 are spaced apart from each other by a dimension "N" representing a minimum diameter of strap receiving aperture 24 which allows free end 44 of strap 12 to be slidably received between first raised portions 64, 66 with minimal deflection of flexible wings 20, 22. Flexible wing 20 also includes a second raised portion 68 located within strap receiving aperture 24 and flexible wing 22 similarly includes a second raised portion 70 which opposes second raised portion 68. Second raised portions 68, 70 are spaced apart from each other by a dimension "P" which is greater than dimension "N" and is sized to permit second raised portions 68, 70 to frictionally grasp the reduced cross sectional end 48 of teeth 46. Second raised portions 68, 70 are positioned at free ends of first and second arms 72, 74 which freely extend away from first raised portions 64, 66. First raised portions 64, 66 have a height "S"

Distal ends of both second raised portions 68, 70 are positioned at a predetermined spacing "Q" from contact surfaces 76, 78 of first raised portions 64, 66. Contact surfaces 76, 78 are each angled to reach a strap receiving aperture facing corner so contact between contact surfaces 76, 78 with engagement end 50 of one of the teeth 46 occurs at the corners where diameter "N" is at its minimum and approaches a diameter of the reduced cross sectional end 48 of the teeth 46. First and second arms 72, 74 have a total thickness "R" including the thickness of second raised portions 68, 70. First raised portions 64, 66 have a height "S" and the contact surfaces 76, 78 define an angle β from a reference datum 80 which is substantially parallel to tether portion 14 and mounting face 38. Each of flexible wings 20, 22 have a thickness "T" in portions substantially parallel to fastener enclosure wall 26 and a thickness "U" less than thickness "T" to allow increasing flexure as they angularly progress towards first raised portions 64, 66. According to several embodiments, dimension "N" is approximately 1.2 mm, dimension "O" is approximately 10.35 mm, dimension "P" is approximately 1.95 mm, predetermined spacing "Q" is approximately 3.0 mm, total thickness "R" is approximately 0.75 mm, height "S" is approximately 0.75 mm, thickness "T" is approximately 1.25 mm, and thickness "U" is approximately 0.9 mm. These dimensions are exemplary and do not limit the disclosure.

As further seen in FIG. 3, strap 12 is flexible to permit wrapping around a perimeter "V" of an object 82 such as but not limited to a tube, pipe, cable bundle, wireway, and the like. A perimeter 84 of strap 12 will follow the general shape of object 82 and is therefore shown in FIG. 3 as circular for example only. A first portion 12' of strap 12 deflects starting at the distal end of tether portion 14 and a distal end 12" immediately connected to free end 44 at a free end portion 44' is oriented to allow free end 44 of strap 12 to be longitudinally aligned on a center axis of strap receiving aperture 24.

Referring now to FIG. 4, a surface 86 of 16 can be spaced by a dimension "W" from mounting face 38. This spacing can minimize any rocking motion of mounting face 38 with respect to a fastener mount surface 88. It is also desirable for an edge surface 90 of the structure of fastener mount surface 88 to be spaced away from the central axis 92 of strap receiving aperture 24. This allows free end 44 and any extra length of strap 12 clearance to pass clearly through strap receiving aperture 24 when strap 12 is engaged about object 82.

Figure 5:
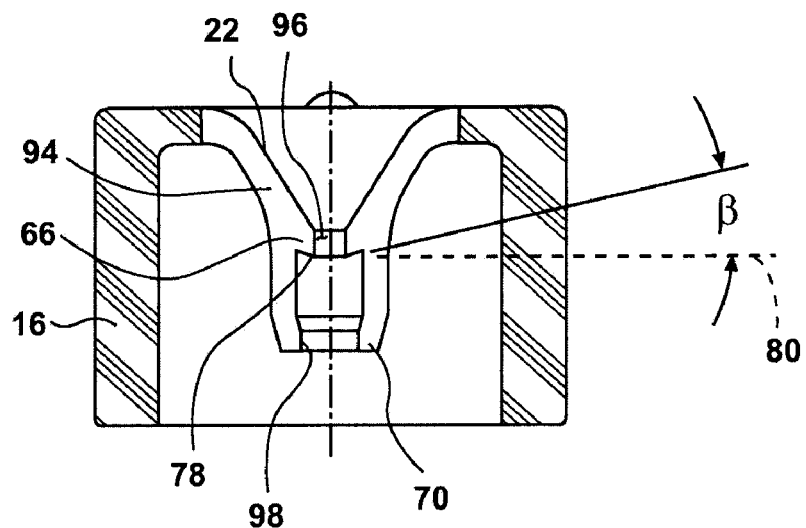
FIG. 5 is a cross sectional end elevational view taken at section 5 of FIG. 4.

Referring now to FIG. 5, the geometry of flexible wing 22 is more clearly visible. The geometry of flexible wing 20 is substantially the same as seen in FIG. 5. A tapering side wall 94 includes a substantially hemispherical-shaped opening 96, which defines acute angled contact surface 78. Angle β created with respect to reference datum 80 is more clearly shown in FIG. 5. According to several embodiments, angle β is approximately 15 degrees. Contact surface 78 creates a positive stop which abuts the engagement end 50 of teeth 46 adjacent to a proximately located one of the reduced cross sectional ends 48. According to several embodiments, second raised portion 70 defines an inner contact face 98 which can be sized to contact approximately 90 degrees of surface of reduced cross sectional ends 48 of teeth 46. The number of degrees of contact can also be varied to suit different sizes of teeth 46.

Figure 6:
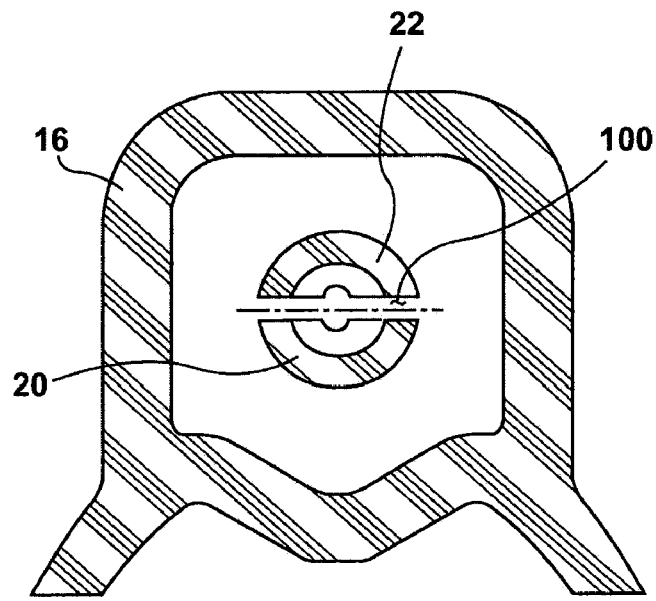
FIG. 6 is a top cross sectional view taken at section 6 of FIG. 5.

As best seen in reference to FIG. 6, a spacing 100 is created between flexible wings 20 and 22. Spacing 100 is predetermined to provide both plastic part tooling clearance and to provide a minimum clearance for free end 44 of strap 12 to help align free end 44 with strap receiving aperture 24.

Figure 7:
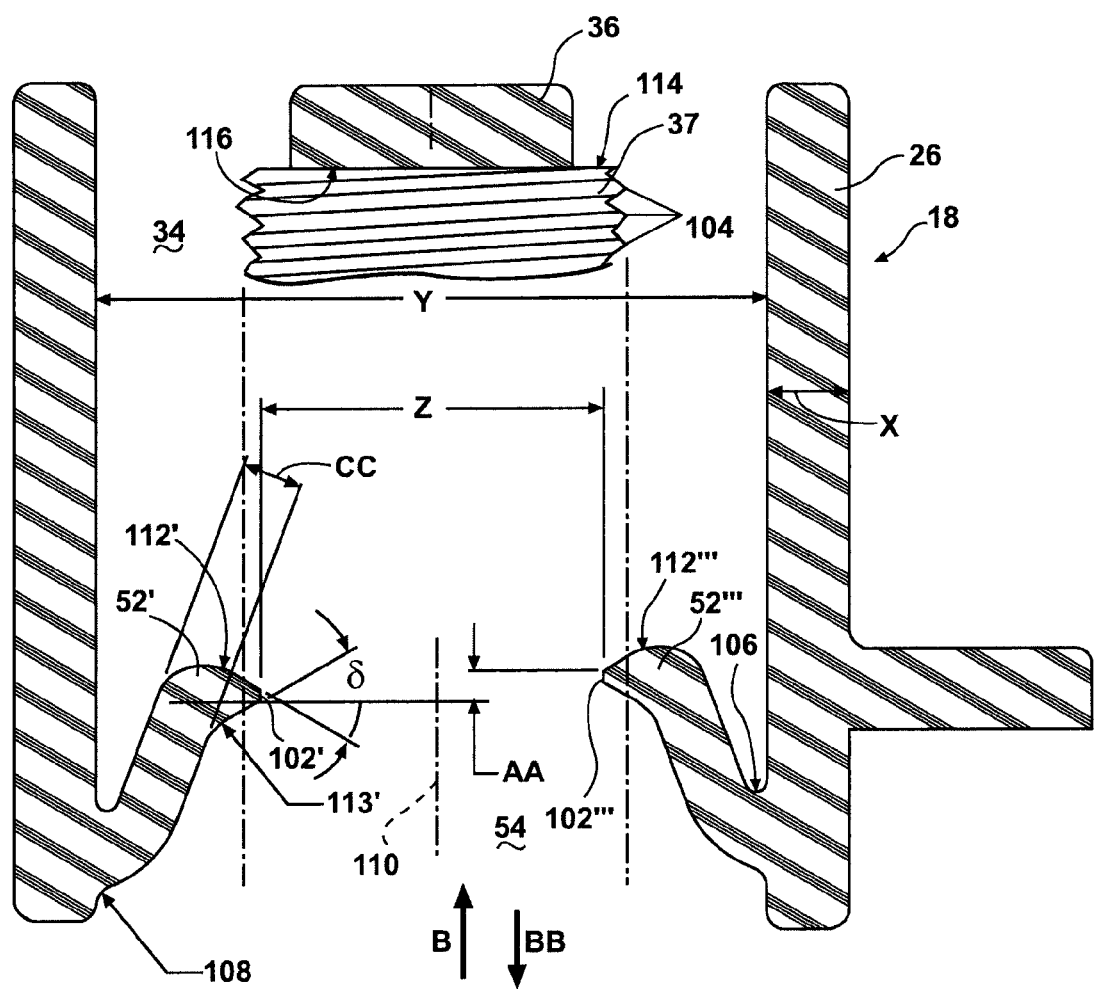
FIG. 7 is a cross sectional view taken at section 7 of FIG. 2.

Referring now to FIG. 7, deflectable arms 52' and 52'" are shown. The geometry of deflectable arm 52" is similar. Fastener enclosure wall 26 has a wall thickness "X" and defines a cavity clearance "Y" of fastener receiving cavity 34. Each of deflectable arms 52 have a fastener tooth engaging end 102 (engaging ends 102' and 102'" are shown) which define a diameter "Z" of fastener receiving aperture 54 substantially equal to the root diameter of the threads of fastener 37. An elevation change "AA" between the bottom of engaging end 102' and the top of engaging end 102'" is predetermined by the thread pitch of the threads 104 of fastener 37. Deflectable arms 52 each include a first hinge point 106 and a second hinge point 108. First and second hinge points 106, 108 allow deflectable arms 52 to deflect away from each other to receive fastener 37 in the installation direction "B".

Second hinge point 108 is located outward of first hinge point 106 with respect to a fastener longitudinal axis 110 to further permit deflectable arms 52 to deflect away from each other when a predetermined downward (as viewed in FIG. 7) force from the threads 104 is applied to angled faces 112', 112'" of deflectable arms 52', 52'" in a fastener release direction "BB". To assist the downward force in deflecting arms 52 and as shown in reference to angled face 112' and an angled face 113', an angle δ is created which in several embodiments is approximately 60 degrees. A thickness "CC" of the deflectable arms 52 is also predetermined to provide the spring force necessary to bias deflectable arms 52 into engagement with fastener 37 while also providing flexibility to permit withdrawal of fastener 37. An end face 114 of fastener 37 will contact an inner face 116 of fastener stop 36 to provide a positive stop for fastener 37 travel within fastener receiving aperture 54.

Figure 8:
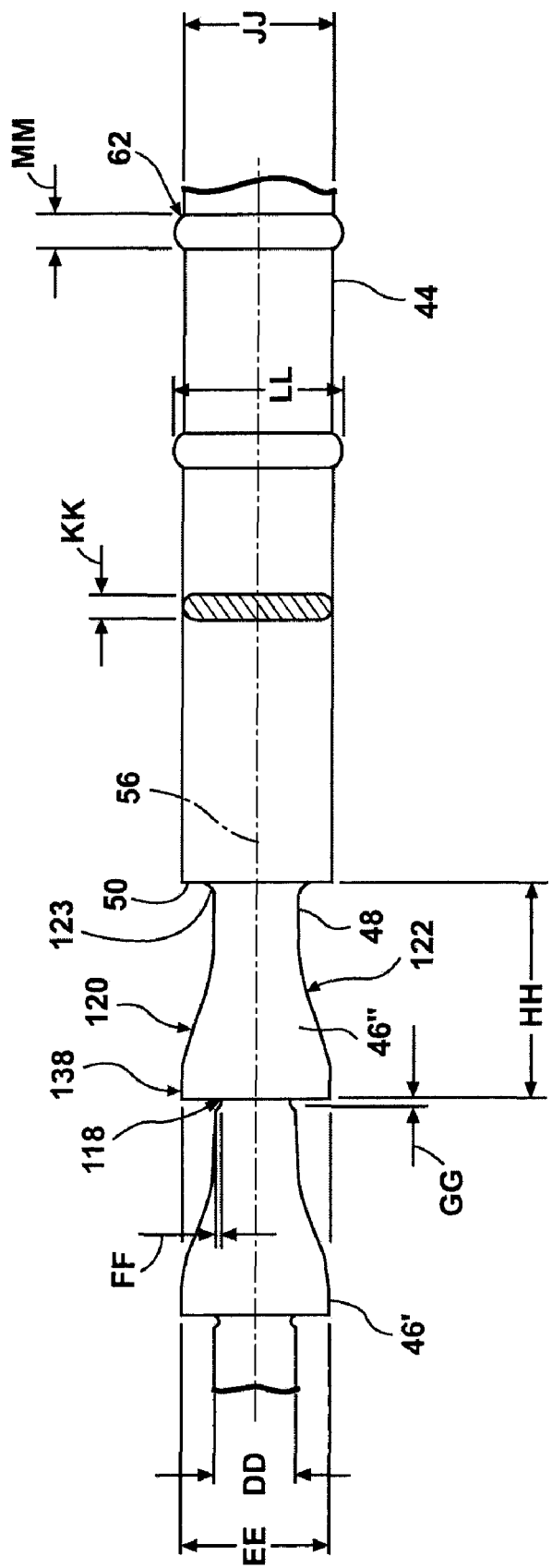
FIG. 8 is a partial plan view taken at area 8 of FIG. 2.

With reference now to FIG. 8, according to several embodiments the geometry of teeth 46 is substantially circular with the reduced cross sectional end 48 having a diameter "DD" and the engagement end 50 defining a diameter "EE" larger than diameter "DD". At the junction of each reduced cross sectional end 48 with a proximate engagement end 50 a notch 118 is created having a notch depth "FF" and a notch width "GG". According to several embodiments, diameter "DD" is approximately 1.2 mm, diameter "EE" is approximately 2.2 mm, notch depth "FF" is approximately 0.1 mm, and notch width "GG" is approximately 0.12 mm. Notches 118 create a frangible point where any one tooth 46' can be separated from a proximate tooth 46" upon application of a predetermined tensile or bending load. Each tooth 46 can conically change from engagement end 50 to reduced cross sectional end 48 or as shown in FIG. 8 can also include a convex-curved outer surface 120 which blends into a concave-curved outer surface 122 before reaching reduced cross sectional end 48. Notch 118 is generally eliminated and replaced by an outwardly directed curved surface 123 for tooth 46" at the junction with free end 44 to prevent free end 44 breaking away from strap 12 without engagement of at least one of the teeth 46.

Free end 44 of strap 12 according to several embodiments has a flattened shaped with an end width "JJ" and a thickness "KK". Each of the ribs 62 has a diameter "LL" and a width "MM". According to several embodiments, end width "JJ" is approximately 2.2 mm, thickness "KK" is approximately 0.8 mm, maximum width "LL" is approximately 2.5 mm, and thickness "KK" is approximately 0.5 mm.

Figure 9:
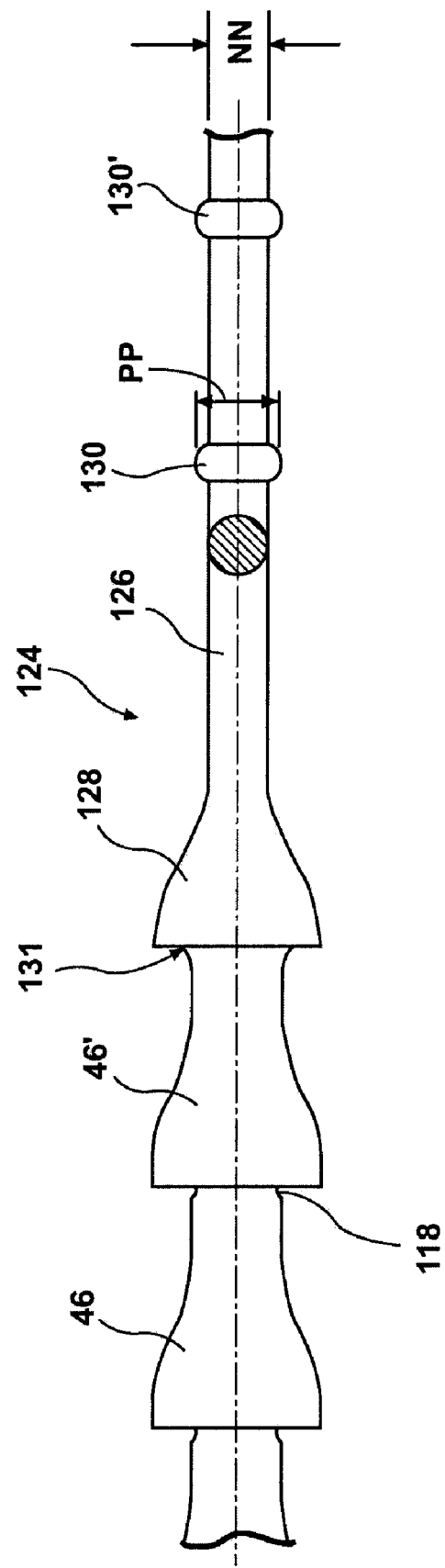
FIG. 9 is a partial plan view of another embodiment of a strap similar to FIG. 8.

Referring to FIG. 9, another embodiment provides a strap 124 having a generally circularly shaped free end 126 having a diameter "NN" and a modified tooth 128 homogenously connected to free end 126. One or more ribs 130 (in this example two ribs 130, 130' are shown) can be provided on free end 126 each having a diameter "PP". Similar to curved surface 123, a curved surface 131 is provided between tooth 46' and tooth 128 in place of notch 118 to reduce the probability of a break occurring between tooth 46' and tooth 128.

Figure 10:
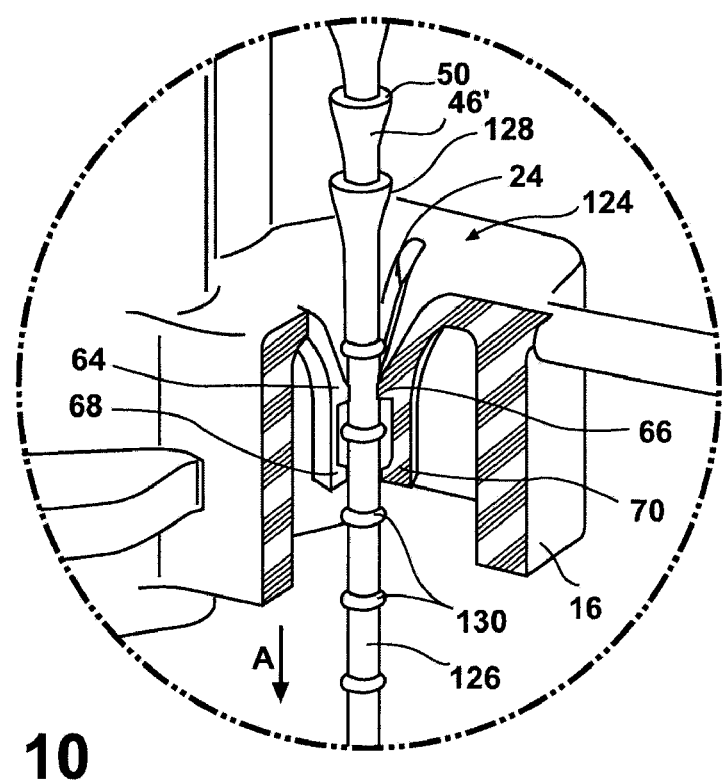
FIG. 10 is a partial cross sectional view of a strap engagement portion of a bundling device of the present disclosure showing initial installation of a tether free end into the tether engagement aperture of the strap engagement portion.
Figure 11:
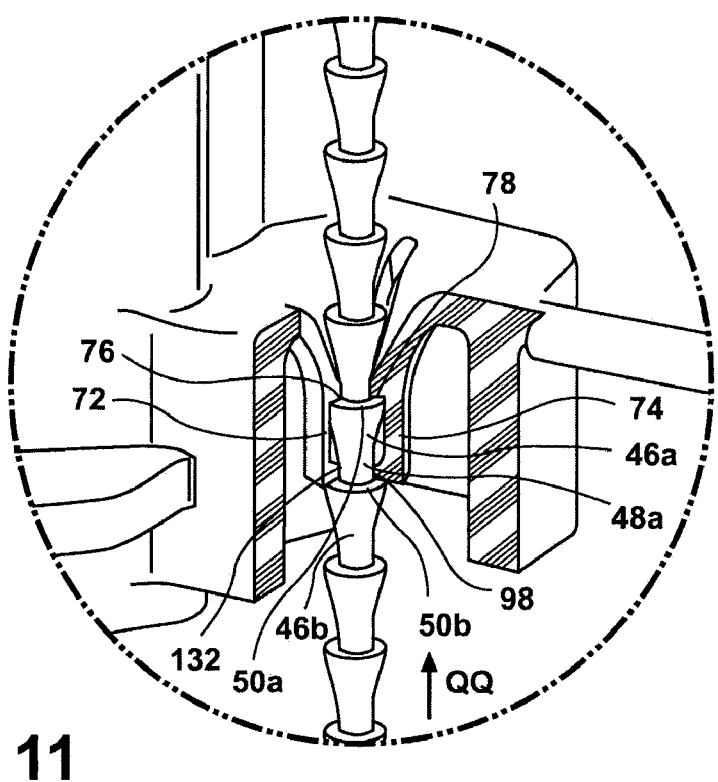
FIG. 11 is a partial cross sectional view similar to FIG. 10 showing engagement of the teeth of the strap.

Referring now to FIGS. 10 through 11, installation of exemplary strap 124 of the present disclosure is shown. It is noted installation of strap 12 follows substantially the same process. Following flexing of strap 124 about an object 82 (shown in FIG. 3), free end 126 is initially inserted into strap receiving aperture 24 in the installation direction "A" and free end 126 is manually grasped and pulled such that ribs 130 each pass both first raised portions 64, 66 and second raised portions 68, 70. As shown in FIG. 11, strap 124 is further pulled through strap receiving aperture 24 until an engagement end 50a of an exemplary tooth 46a is engaged by contact surfaces 76, 78 of first raised portions 64, 66. At this same time, inner contact face 98 of second arm 74 and an inner contact face 132 (similar to inner contact face 98) of first arm 72 elastically contract toward each other to frictionally grip a reduced cross sectional end 48a of tooth 46a. Engagement end 50*b* of tooth 46*b* is positioned below (as viewed in FIG. 11) first and second arms 72, 74. Engagement end 50*a* meets contact surfaces 76, 78 to prevent removal of any teeth 46 of strap 124 in a strap removal direction "QQ". Contact between engagement end 50*b* and first and second arms 72, 74 further prevents removal of strap 124.

Figure 12:
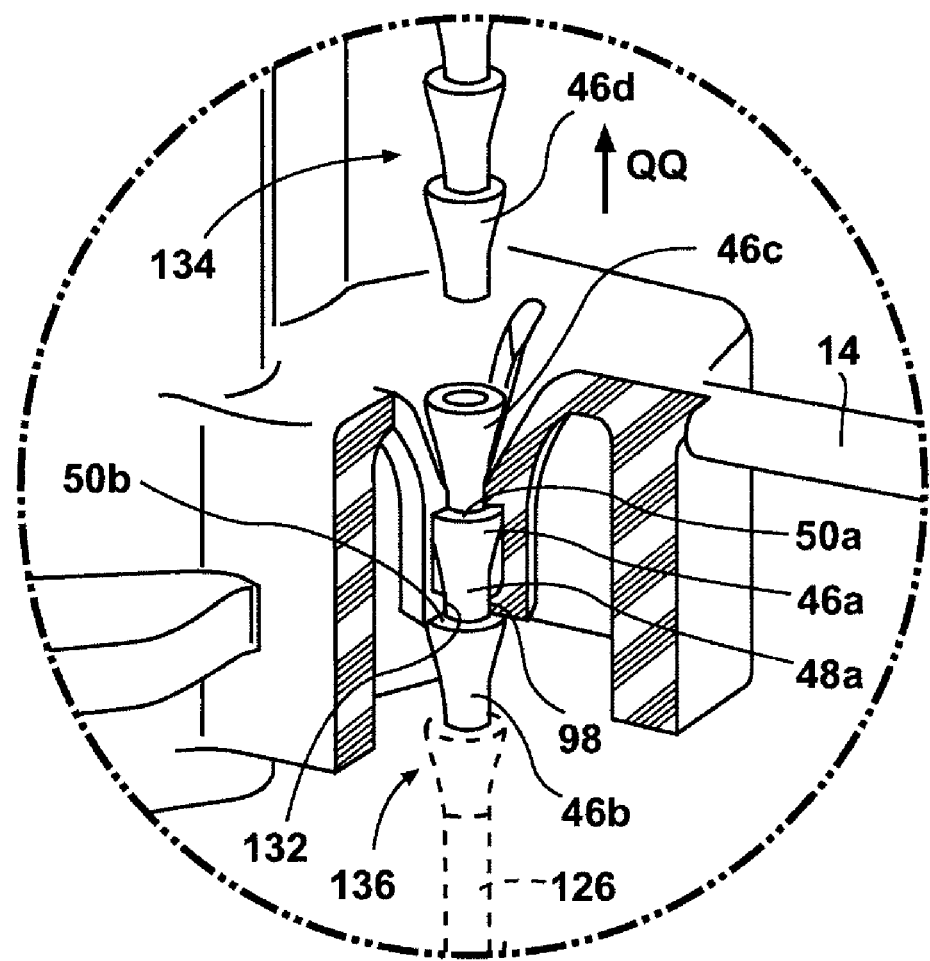
FIG. 12 is a partial cross sectional view similar to FIG. 10 following fracture of the strap.

As best seen in FIG. 12, when it is desired to remove object 82, a further load is placed on strap 124 in removal direction "QQ" until the predetermined load is reached at which time strap 124 breaks at one of the frangible locations defined by notches 118. When strap 124 breaks, a first portion 134 will remain connected to the tether portion 14 and thereby to strap engagement portion 16. A broken-free second portion 136 or disassociated end of strap 124 is retained in the example shown in contact with bundling device 10 by frictional engagement between inner contact face 98 and inner contact face 132 at reduced cross sectional end 48*a* of tooth 46*a*. In the example shown second portion 136 includes a tooth 46*c* immediately upstream of tooth 46*a*, a tooth 46*b* immediately downstream of tooth 46*a*, and any further downstream teeth 46 as well as free end 126 (each shown in phantom). By retaining second portion 136, the time/costs associated with clean-up of this section from for example an assembly area floor is saved. Second portion 136 can also include tooth 46*c*, tooth 46*d*, or a further upstream tooth depending on which notch 118 defines the break location.

Referring again to FIGS. 3, 8, and 12, strap 12 (or strap 124) is engaged by inserting free end 44 (126) into strap receiving aperture 24 in the direction of arrow "A". As strap 12 is inserted, first raised portions 64, 66 elastically deflect radially outward as a maximum diameter end 138 of each tooth 46 slides past them, and then spring back by elastic force. When contact surfaces 76, 78 contact the engagement end 50*a* of one tooth (for example tooth 46*a* of FIG. 12), the engagement end 50*b* of the immediately downstream tooth (for example tooth 46*b* of FIG. 12) are contacted by free ends of arms 72, 74. The spacing between the first and second contact surfaces 76, 78 and the free ends of arms 72, 74 are therefore predetermined to substantially equal the length "HH" of each of the teeth 46.

Figure 13:
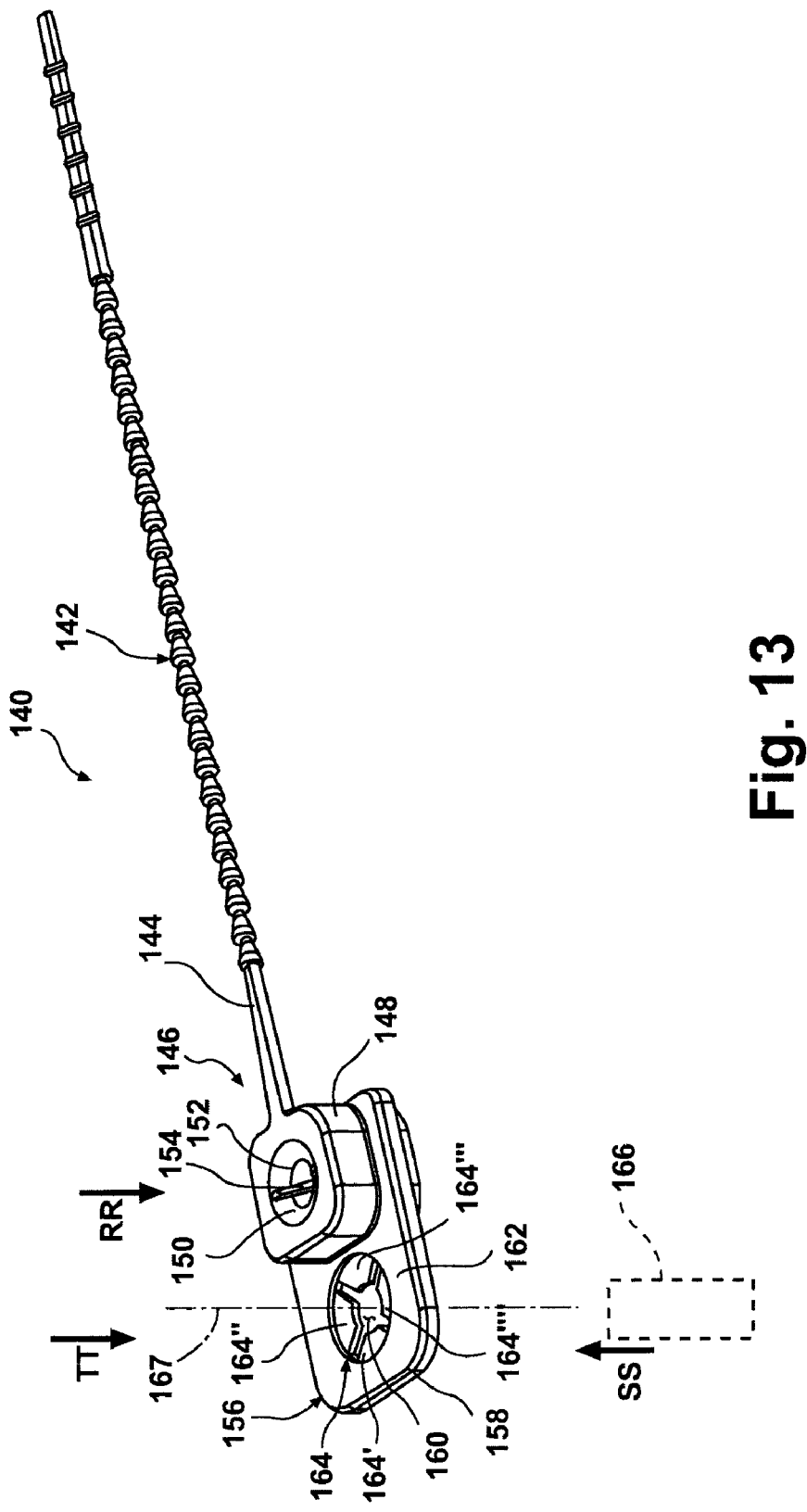
FIG. 13 is a side perspective view similar to FIG. 1 of another embodiment of a bundling device according to the present disclosure.

Referring now to FIG. 13, in another embodiment of the present disclosure, a bundling device 140 is modified with respect to bundling device 10. Bundling device 140 includes a strap 142 and a tether portion 144 which are substantially the same as strap 12 and tether portion 14, therefore no further discussion of these items is required. Tether portion 144 is homogenously connected to a locking mechanism 146 which is modified from locking mechanism 15. Locking mechanism 146 includes a strap engagement portion 148 which is similar to strap engagement portion 16 and includes at least two flexible wings 150, 152 which define a strap receiving aperture 154 adapted to receive strap 142 in a strap receiving direction "RR".

A fastener mount portion 156 is substantially modified from fastener mount portion 18. Fastener mount portion 156 defines a planar flange 158 which is homogenously connected to three of the 4 sides of a rectangular-shaped strap engagement portion 148. A fastener receiving aperture 160 is created in an extending portion 162 of flange 158. A plurality of flexible wings 164 are created proximate to fastener receiving aperture 160. According to several embodiments four flexible wings 164', 164", 164'", and 164"" are provided, however, the quantity of flexible wings 164 can vary from two and greater. Flexible wings 164', 164", 164'", and 164"" are each oriented substantially coplanar with flange 158 in a non-deflected condition shown. Flexible wings 164', 164", 164'", and 164"" can deflect either upwardly or downwardly (as viewed in FIG. 13) so that a fastener 166 can be received in fastener receiving aperture 160 in either a first installation direction "SS" or an opposite second installation direction "TT" coaxially with a fastener receiving aperture axis 167.

Figure 14:
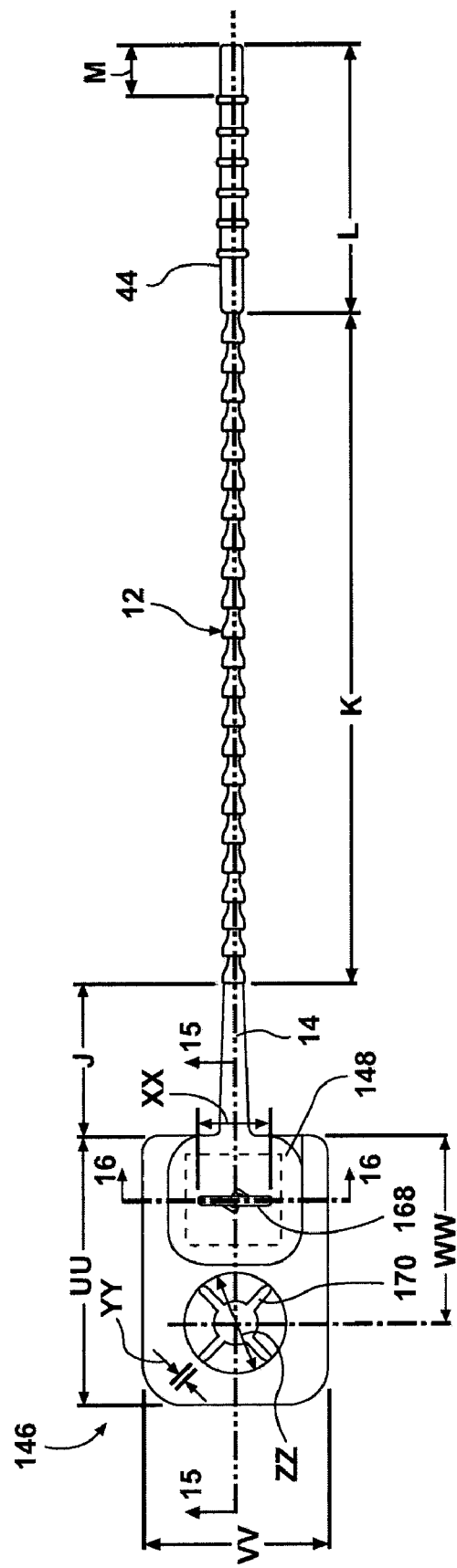
FIG. 14 is a top plan view of the bundling device of FIG. 13.

Referring now to FIG. 14, dimensions "J", "K", "L", and "M" are substantially equal to the same dimensions shown for bundling device 10 on FIG. 2. A longitudinal slot 168 is created proximate to strap receiving aperture 154 to accommodate entry of free end 44 of strap 12. Longitudinal slot 168 has a length "XX" which in several embodiments is approximately 7.9 mm. According to several embodiments locking mechanism 146 has a mechanism length "UU", a mechanism width "VV", and fastener receiving aperture 160 is spaced at a distance "WW" from the connection location of tether portion 14. Each successive pair of flexible wings 164 are separated by a slot 170 which has a slot width "YY". Flexible wings 164 are created within a substantially circular partial cavity having a cavity diameter "ZZ". According to several embodiments, mechanism length "UU" is approximately 28.6 mm, mechanism width "VV" is approximately 20.2 mm, distance "WW" is approximately 19.9 mm, length "XX" is approximately 7.9 mm, slot width "YY" is approximately 1.0 mm, and cavity diameter "ZZ" is approximately 10.5 mm.

Figure 15:
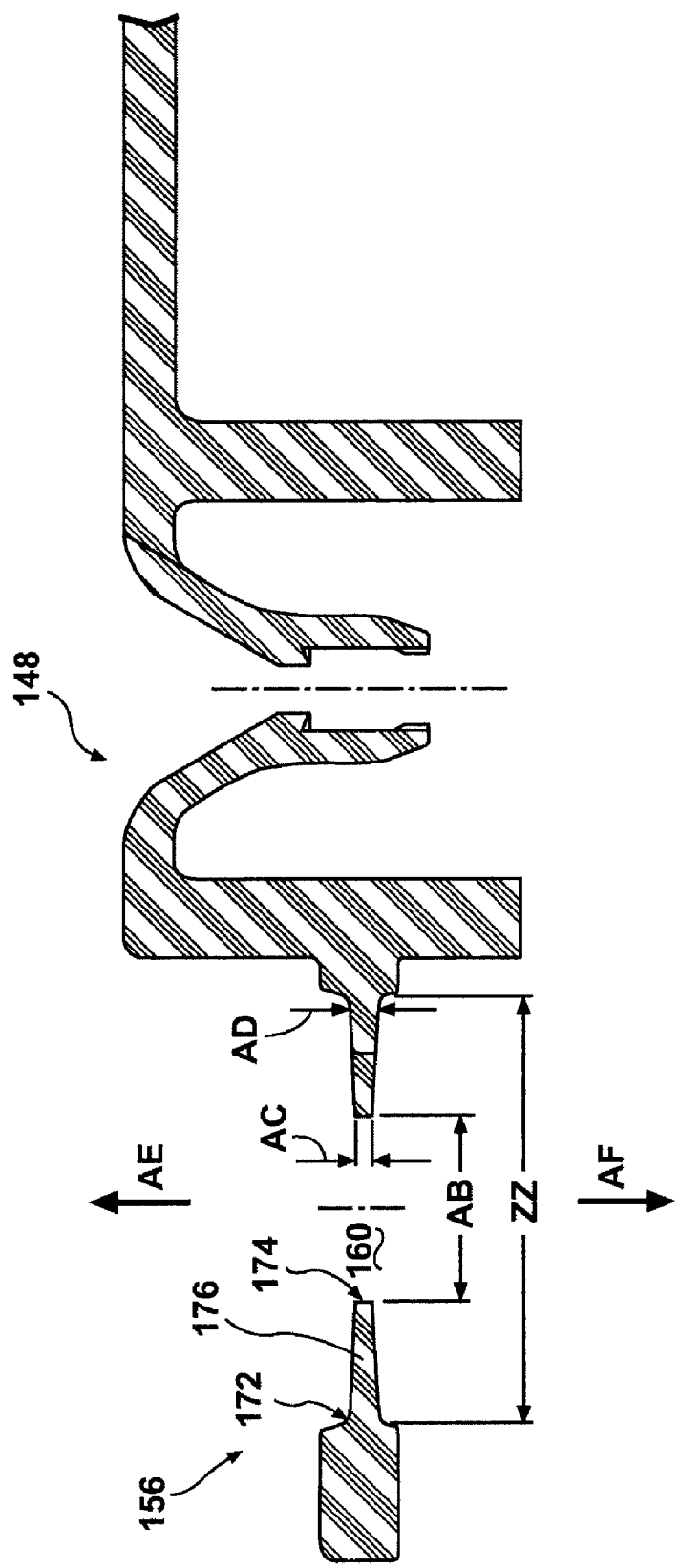
FIG. 15 is a cross sectional side elevational view taken at section 15 of FIG. 14.

As best seen in FIG. 15, the details of strap engagement portion 148 are substantially the same as strap engagement portion 16 and therefore do not require further discussion. Fastener receiving aperture 160 has a diameter "AB" which is substantially equal to or larger than a thread root diameter, but smaller than a thread outside diameter of fastener 166. Fastener 166 can also be a smooth face tube or rod and diameter "AB" can be selected to provide an interference or contact fit with the smooth face. In several embodiments diameter "AB" is approximately 4.6 mm. Each of the flexible wings 164 has a connecting end 172 and a free end 174 joined by a continuously tapering body 176. A thickness "AC" of free end 174 is less than a thickness "AD" of connecting end 172 and in several embodiments, thickness "AC" is approximately 0.45 mm and thickness "AD" is approximately 0.75 mm. Flexible wings 164 are collectively deflectable in either a first direction "AE" or an opposite second direction "AF" to permit fastener 166 to be received from either above or below the non-deflected co-planar condition of flexible wings 164 shown in FIG. 15.

Figure 16:
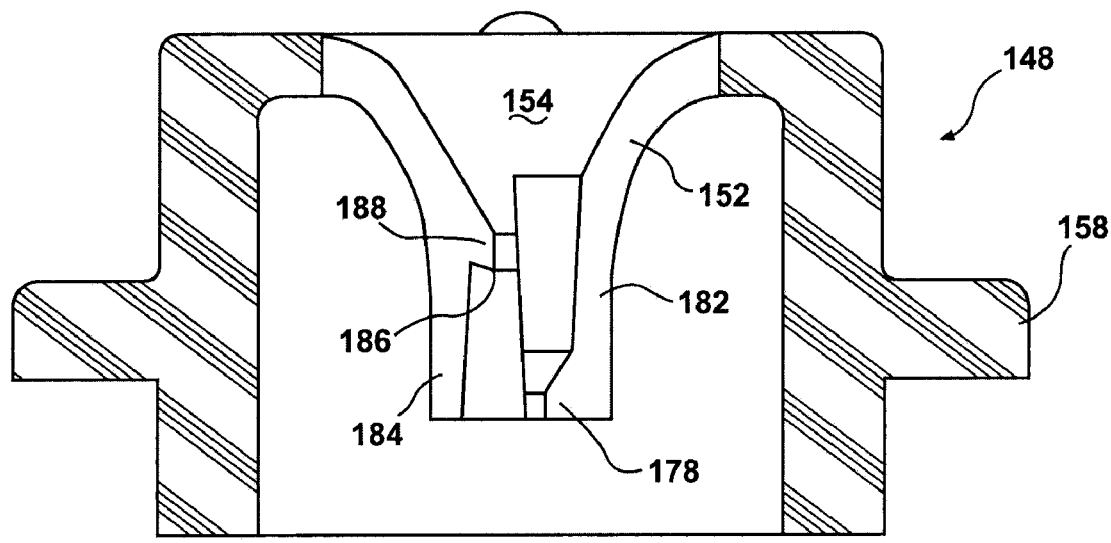
FIG. 16 is a cross sectional end elevational view taken at section 16 of FIG. 14.
Figure 17:
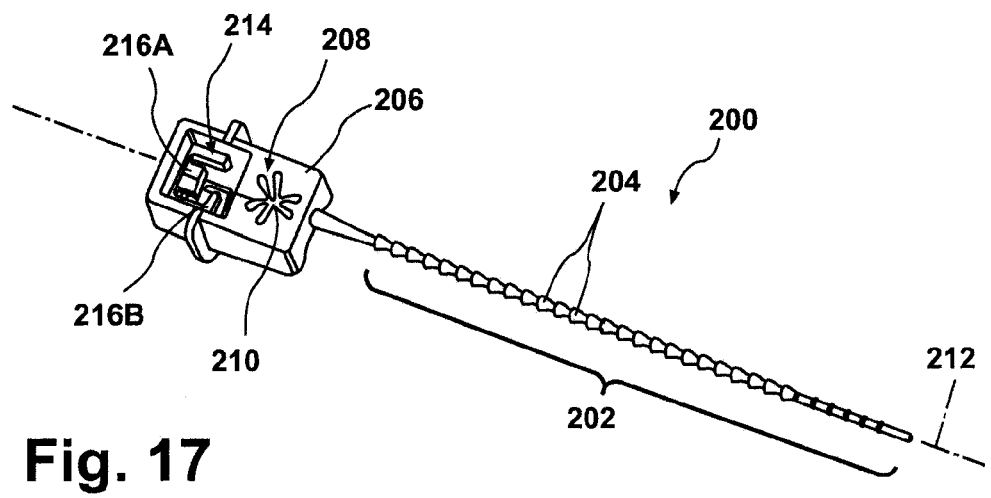
FIG. 17 is a front perspective view of further embodiments of a break-away bundling device of the present disclosure.

Referring to FIG. 16, the geometry of strap receiving aperture 154 at deflectable wing 152 is modified to show a second raised portion 178 rotated approximately 45 degrees out of plane from a first raised portion (not shown) of a second arm 182 of deflectable wing 150. A first arm 184 provides a contact surface 186 (similar to contact surfaces 76, 78) of a first raised portion 188. An end and first raised portion of second arm 182 (not visible in this view) are oriented approximately 180 degrees from contact surface 186 of first raised portion 188.

It is noted strap 12 or 124 can be circular in cross section as noted herein, or can be provided in multiple other geometric shapes, not limited to oval or rectangular. Oval and rectangular shapes are shown in reference to FIG. 4A. Free ends 44 and 126 can be circular as shown in FIG. 9, oval, rectangular, or substantially flattened in shape. The flattened shape as shown in FIG. 8 is oriented to allow free end 44 or 126 to align with slot 168 shown in reference to FIG. 14. Fastener mount portions 18 and 156 can be pressed onto a pre-installed fastener such as fasteners 37 or 166, or rotated to threadably engage with threads of fasteners 37 or 166. Similarly, fastener mount portions 18 and 156 can be pulled away from engagement with a pre-installed fastener such as fasteners 37 or 166, or rotated to threadably disengage with threads of fasteners 37 or 166.

Referring to FIGS. 17 through 21, according to several embodiments of a bundling device 200 a strap 202 includes a plurality of teeth 204 similar to teeth 12, but lacking notches 118. Strap 202 is therefore not intended to be frangible when released from the bundle of wires or wiring harnesses (not shown). A locking mechanism 206 homogenously connected to strap 202 includes a strap engagement portion 208 having a strap receiving aperture 210 configured substantially perpendicular to a bundling device/strap longitudinal axis 212, and a fastener receiving portion 214 which receives a fastener (not shown) substantially parallel to longitudinal axis 212. A pair of opposed legs 216a, 216b are each oriented substantially parallel to the longitudinal axis 212 of fastener receiving portion 214 and act to engage threads of the fastener.

Figure 18:
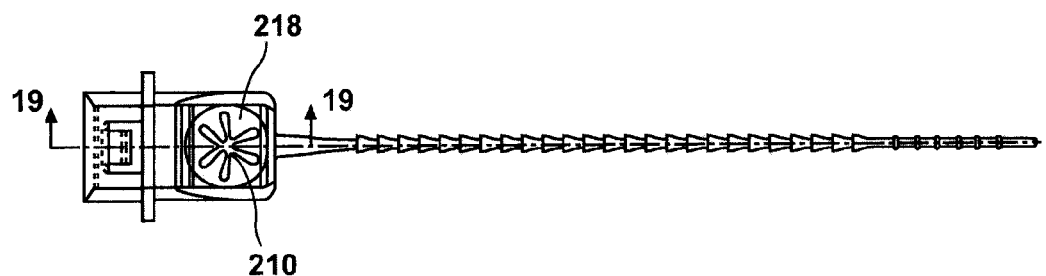
FIG. 18 is a top plan view of the device of FIG. 17.
Figure 19:
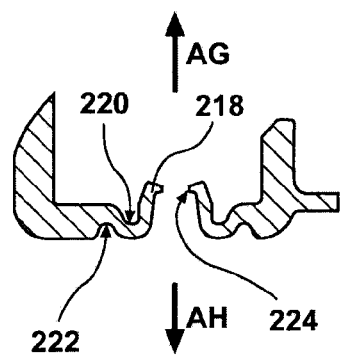
FIG. 19 is a cross-sectional view taken at section 19 of FIG. 18.

In the strap engagement portion shown more clearly in FIGS. 18 and 19, a plurality of flexible wings 218 extend inward toward strap receiving aperture 210. Flexible wings 218 each include a first hinge point 220 and a second hinge point 222. Hinge points 220, 222 allow flexible wings 218 to deflect away from each other to receive strap 202 in an installation direction "AG". Hinge points 220, 222 also permit flexible wings 218 to deflect toward each other when strap 202 is pulled in a release direction "AH" with a predetermined force. First hinge point 220 is a substantially U-shaped portion of flexible wings 218 generally facing an installation direction of strap 202. Second hinge point 222 is also a substantially U-shaped portion of flexible wings 218 generally facing a withdrawal direction of strap 202 and oppositely directed from first hinge point 220. Individual end features 224 created at distal ends of each of flexible wings 218 allow both a retention and a release capability to retain and release teeth 204.

Figure 20:
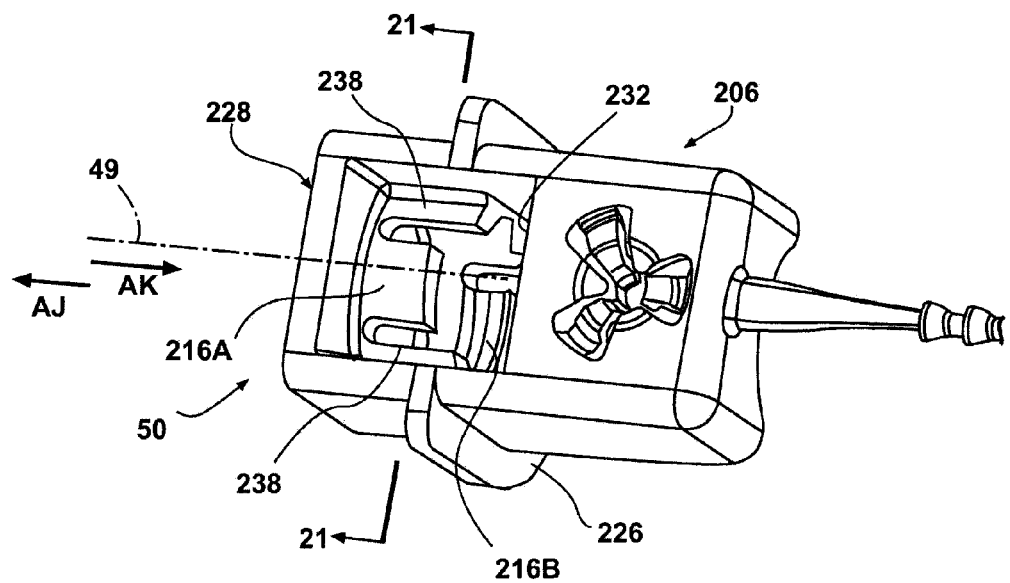
FIG. 20 is a front perspective view of the locking mechanism of the device of FIG. 17.
Figure 21:
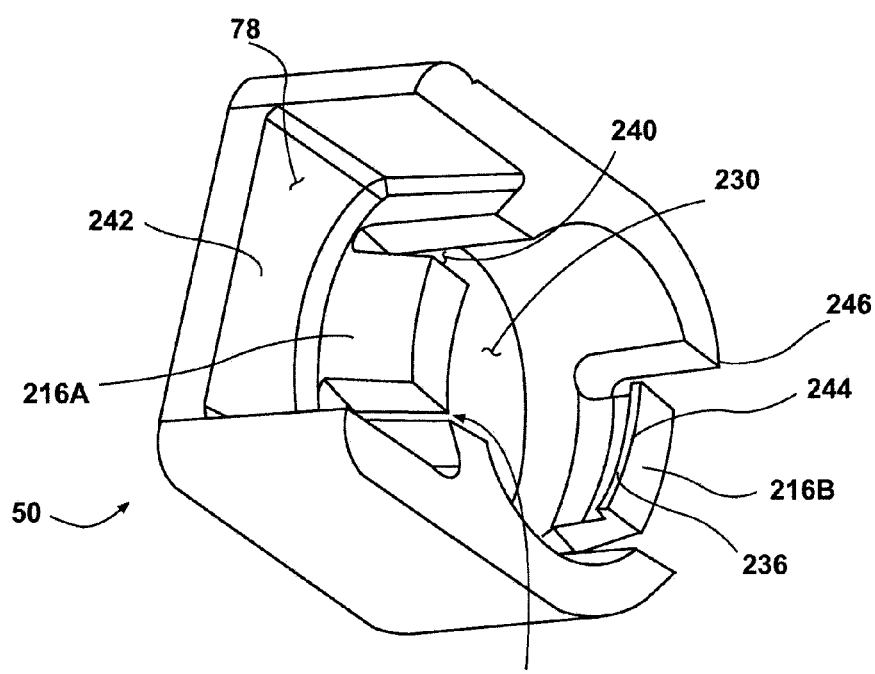
FIG. 21 is a partial cross-sectional view taken at section 21 of FIG. 20.

Referring more specifically to FIGS. 20 and 21, fastener receiving portion 214 includes a finger contact flange 226 which allows an installer to grasp locking mechanism 206 and push a fastener receiving end 228 of fastener receiving portion 214 onto a fastener (not shown) in a direction "AJ" until fastener receiving end 228 abuts the panel or body part from which the fastener extends. The fastener enters a substantially circular fastener clearance aperture 230 and can continue in a direction "AK" until the fastener contacts an end wall 232. The threads of the fastener are engaged by a first radially extending lip 234 of leg 216a which extends substantially perpendicular to leg 216a and toward fastener clearance aperture 230 and a second radially extending lip 236 of leg 216b which is a mirror image of extending lip 234 and are therefore directed toward each other. Legs 216a and 216b are created by eliminating material (for example by gates created in a mold) from or machining a tubular wall 238, creating a clearance opening 240 on each side of legs 216a and 216b which provide some flexibility for bending in legs 216a and 216b. Legs 216a, 216b are spaced from fastener receiving end 228 by a thickness of an end wall 242. Each of first and second lips 234, 236 define an arc 244 which substantially matches a thread pitch of the fastener. A substantially rectangular opening 246 is created in tubular wall 238 providing clearance for legs 216a, 216b.

Figure 22:
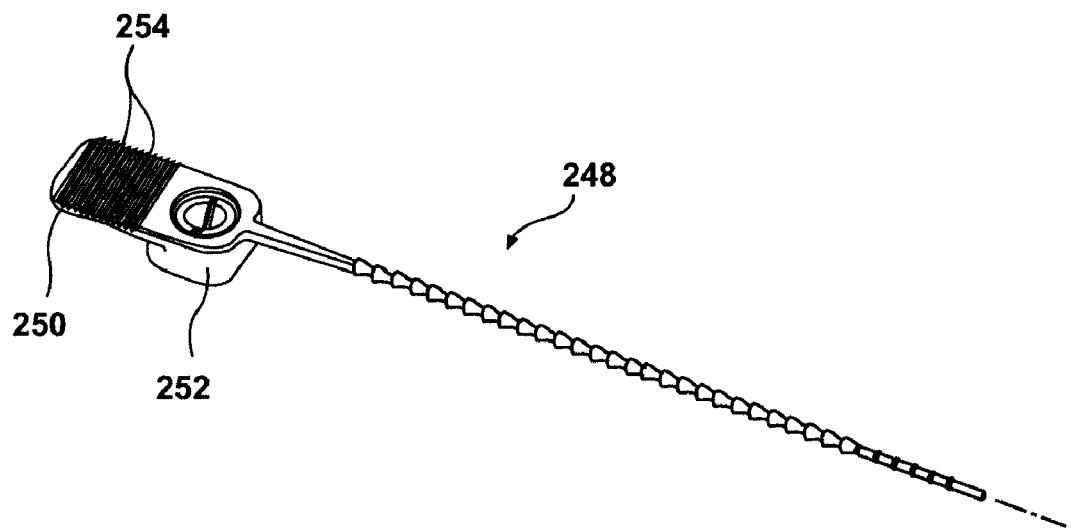
FIG. 22 is a front perspective view of another embodiment of the break-away bundling device of the present disclosure.

Referring generally to FIG. 22, additional embodiments of a bundling device 248 provide a finger hold element 250 extending from a locking mechanism 252. Multiple parallel grooves/ridges 254 can be provided on one or both opposite faces of finger hold element 250 to increase gripping force on finger hold element 250. This manual hold feature can be provided when the locking mechanism 252 does not include a fastener engagement portion.

Figure 23:
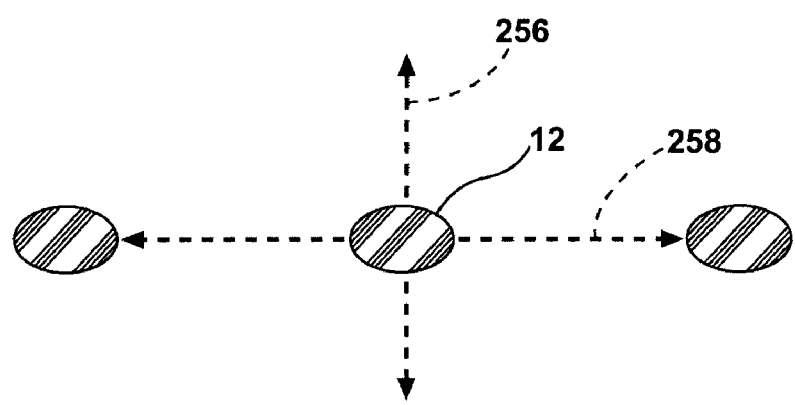
FIG. 23 are cross-sectional views taken at several locations through the strap of the present disclosure.

Referring generally to FIG. 23, according to several embodiments an oval shape is used for strap 12, with different sections through the strap 12 and teeth 46 shown. The oval shape permits bending generally in a first plane 256 taken through the longitudinal axis of the strap and assisting entrance of strap 12 into aperture 26. The oval shape resists bending in a transverse direction or plane 258. This helps prevent strap 12 from breaking before or during insertion/use.

Material for the break-away bundling devices of the present disclosure is generally a polymeric material such as polypropylene or nylon, however an additive can be provided if the devices are injection molded during the melt phase and prior to injection molding. The additive renders the resultant plastic part "bio-degradable". The intent of the additive is that after use of the device, which can be used as a temporary device, the device if discarded will degrade over time, particularly when in contact with the ground or earth materials. An example of such an additive is Bio-Batch® available from Bio-Tec Environmental LLC of Cedar Crest, N.M.

The present disclosure provides a polymeric or plastic material tie device intended for example for wire bundles used for example in motor vehicle installations to group multiple wire bundles and/or wiring harnesses as a sub-assembly prior to release and final installation of the individual wire bundles or wiring harnesses. The wire bundles or wiring harnesses are bundled for example at a supplier's location and shipped to the installer. Once received by the installer, the break-away bundling device is designed to be frangible or the strap is releasable to allow the wire bundles or wiring harnesses to be separated for individual installation.

Bundling devices of the present disclosure are not limited to the use of a stud mount portion. Bundling devices of the present disclosure can include only the strap and strap engagement portion that can include or eliminate the flange used for manual installation and therefore eliminate the stud engagement portion entirely. When a stud mount portion is used, bundling devices of the present disclosure are not limited to the geometric shapes or to the use of deflectable arms described herein. Other geometric shapes can be used, including but not limited to circular, oval, triangular, rectangular, and the like. Other forms of fastener engagement elements and different quantities can also be used, including designs with a frictional contact surface having no deflectable arms, one or more than one deflectable arm(s), ridges or teeth within the fastener engagement portion that supplement or replace the deflectable arms, or similar elements that grip a smooth or threaded surface of a fastener.

There are several advantages of the bundling devices of the present disclosure. By grasping the strap that is passed through the strap engagement portion, when the strap is broken to remove the stored object, a broken free end of the strap is retained which eliminates the loose piece that frequently ends up on an assembly room floor. The entire bundling device is therefore easily recovered for discharge or reuse. By orienting the flexible wings of the present disclosure to allow for both insertion and retraction of a fastener, the bundling device can be manually pressed onto a fastener for temporary positioning of the bundling device for transport of the object. Flanges provided on the locking mechanism promote manual connection and disconnection from the fastener. By changing the geometry of the strap between embodiments, the strap can be made more flexible in a predetermined bending direction toward the strap receiving aperture and less flexible in bending planes outside of the plane of the strap receiving aperture. By providing a notch in each of the teeth the load required to break the strap is reduced and can be predetermined so that the strap does not have to be cut to remove it.

What is claimed is:

1. A bundling device, comprising:
   a molding of a polymeric material including:
   a flexible strap having multiple teeth each including a notch, the strap frangible at the notch of any one of the teeth; and
   a strap engagement portion connected to the strap including first and second flexible wings defining a strap receiving aperture therebetween receiving the flexible strap in a first direction, the flexible wings engaging successive ones of the teeth to oppose removal of the strap in an opposite second direction;
   the first and second flexible wings each include:
   a first arm having a first raised portion extending into the strap receiving portion; and
   a second arm having a second raised portion axially displaced with respect to the first raised portion and oriented approximately 45 degrees out of plane with respect to the first raised portion; and
   a fastener mount portion homogenously connected to the strap engagement portion, the fastener mount portion including:
   a planar flange homogeneously connected to three sides of the strap engagement portion;
   a fastener receiving aperture created in the flange; and
   a plurality of deflectable arms created proximate to and extending toward the fastener receiving aperture, all including a connecting end connected to the planar flange, a free end and a continuously tapering body between the connecting end and the free end, the free end having a thickness less than the connecting end, and all created in a circular cavity of the planar flange, the deflectable arms each oriented substantially coplanar with the flange in a non-deflected condition and together deflectable with respect to the flange;
   wherein a fastener is movable within the fastener receiving aperture in each of a first direction and an opposite second direction coaxial with a fastener receiving aperture axis, with the fastener engaged by the plurality of deflectable arms.

2. The bundling device of claim 1, wherein the fastener received within the fastener receiving aperture is releasably engaged by deflecting the collectively deflectable wings to attach the bundling device to the fastener.

3. The bundling device of claim 1, whereby a predetermined load applied to the flexible strap operates to break the strap such that a broken-free portion of the strap including the successive ones of the teeth is retained by the flexible wings.

4. The bundling device of claim 1, wherein the first raised portion includes a contact surface contacting a first one of the successive ones of the teeth, and the second raised portion is oriented to contact a second one of the successive ones of the teeth.

* * * * *